(12) United States Patent
Takahashi

(10) Patent No.: US 8,481,650 B2
(45) Date of Patent: Jul. 9, 2013

(54) PROCESS FOR PRODUCTION OF POLYMERS HAVING FUNCTIONAL GROUPS, AND STAR POLYMERS OBTAINED THEREBY

(75) Inventor: Eiji Takahashi, Chiba (JP)

(73) Assignee: Nippon Soda Co., Ltd., Tokyo (JP)

( * ) Notice: Subject to any disclaimer, the term of this patent is extended or adjusted under 35 U.S.C. 154(b) by 222 days.

(21) Appl. No.: 13/124,905

(22) PCT Filed: Nov. 6, 2009

(86) PCT No.: PCT/JP2009/005903
§ 371 (c)(1),
(2), (4) Date: Apr. 19, 2011

(87) PCT Pub. No.: WO2010/052916
PCT Pub. Date: May 14, 2010

(65) Prior Publication Data
US 2011/0218302 A1    Sep. 8, 2011

(30) Foreign Application Priority Data

Nov. 7, 2008   (JP) ................................ 2008-286791

(51) Int. Cl.
*C08F 4/46*  (2006.01)

(52) U.S. Cl.
USPC ........... 525/384; 525/274; 525/298; 525/299; 525/316; 526/174; 526/181; 526/346

(58) Field of Classification Search
USPC .......... 525/274, 298, 299, 316, 384; 526/174, 526/181, 346
See application file for complete search history.

(56) References Cited

U.S. PATENT DOCUMENTS

2007/0167587 A1   7/2007   Satoh et al.

FOREIGN PATENT DOCUMENTS

| DE | 37 10 468 | 10/1988 |
|---|---|---|
| JP | 03-231904 | 10/1991 |
| JP | 04-011605 | 1/1992 |
| JP | 07-005649 | 1/1995 |
| JP | 2005-533152 | 11/2005 |
| JP | 2006-069922 | 3/2006 |
| JP | 2008-007766 | 1/2008 |
| JP | 2008-280378 | 11/2008 |
| WO | 2005/082946 | 9/2005 |

OTHER PUBLICATIONS

Full English translation of DE 3710468.*
International Preliminary Report on Patentability, issued for PCT/JP2009/005903, mailed Jun. 30, 2011, 8 pages.
European Search Report issued for 09824616.8, mailed Sep. 19, 2012, 9 pages.
Hayashi, Mayumi, et al., "Synthesis of End-Functionalized Polymers by Means of Living Anionic Polymerization Using 1,1-Diphenylethylene Derivatives", Society Journal of "The Society of Rubber Industry, Japan", 2007, vol. 80, No. 1, pp. 20-24.
International Search Report, PCT Application No. PCT/JP2009/005903, dated Feb. 2, 2010.

* cited by examiner

*Primary Examiner* — Mark Kaucher
(74) *Attorney, Agent, or Firm* — Kenyon & Kenyon, LLP

(57) ABSTRACT

It is to provide a method for producing a polymer by a living anionic polymerization, wherein the number of functional groups and the introduction position are accurately specified in the polymer. For this purpose, a cinnamyl alcohol represented by the following formula [I] or a derivative thereof is subjected to a reaction when conducting a living anionic polymerization. In formula [I], $R_1$ represents an alkyl group or alkoxy group; m represents an integer of 0 to 5 and when m is 2 or more, $R_1$s may be the same or different; $R_5$ represents a hydrogen atom, alkali metal atom, trialkylsilyl group or a substituent represented by the following formula [II]. In formula [II], $R_3$ represents a hydrogen atom or a C1-C6 alkyl group; and $R_4$ represents an alkyl group which may be substituted by an alkoxy group, a cycloalkyl group which may be substituted by an alkoxy group, a phenyl group which may be substituted by an alkyl group, or a phenyl group which may be substituted by an alkoxy group).

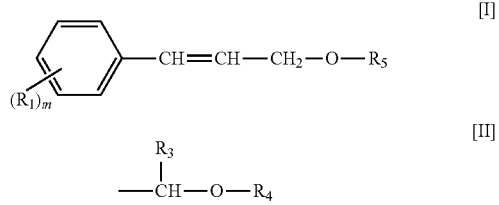

3 Claims, No Drawings

PROCESS FOR PRODUCTION OF POLYMERS HAVING FUNCTIONAL GROUPS, AND STAR POLYMERS OBTAINED THEREBY

TECHNICAL FIELD

The present invention relates to a method for producing a polymer comprising functional groups by anionic polymerization and to a star polymer obtained by the method. Since polymers obtained by the production method of the present invention comprise a hydroxy group or a protected hydroxy group at an end and/or in the inside of the polymer, various types of functionalization are enabled by using such group as the base point. The polymers can also be used as various polymeric intermediates (prepolymers) and preferably used for paints and adhesives and as the raw materials thereof.

The present application claims priority to Japanese Patent Application No. 2008-286791 filed on Nov. 7, 2008, the content of which is herein incorporated.

BACKGROUND ART

For introducing functional groups into a polymer, methods in which a functional group is introduced into a monomer are commonly practiced. However, such methods have not been suitable to design precise polymers due to difficulties in accurately specifying the number of functional groups and the introduction position.

On the other hand, it has been attempted to introduce a functional group into a polymerization initiator. In such attempt, however, a problem has been raised that the number of polymeric functional groups, etc. tends to be uneven in a polymer obtained by radical polymerization using a radical polymerization initiator containing a functional group, because a termination reaction occurs due to chain transfer or radical coupling.

In this regard, these events tend not to occur when using initiation systems that are used for a living radical polymerization, so that the number of functional groups and the introduction position can be accurately specified. Nevertheless, when, for example, synthesizing block polymers, especially multiple-block polymers, it is necessary to collect and purify a polymer every time a polymer consisting of a single component has been polymerized and thus there has been a problem of necessitating a considerably time-consuming work and high cost.

In case of a living anionic polymerization, when a polymerization initiator into which a protected functional group has been introduced is used, it will serve as a useful means for functionalization of a polymer, because the functional group is introduced into the initiation end so that the number of functional groups and the introduction position can be accurately specified. While some of such polymerization initiators are commercially supplied and available, there has been a problem depending on the solvent used that reactivity of the initiator becomes poor and results in a poor efficiency in initiating polymerization.

Further, in the production of a functional group-introduced polymer by a living anionic polymerization, there has been disclosed a production method using an adduct consisting of an organic alkali metal compound such as alkyllithium and a 1,1-diphenylethylene derivative having a functional group as a polymerization initiator (e.g., see Patent Documents 1-3), and a production method using a reaction of an anionic living polymer such as polystyryllithium and a 1,1-diphenylethylene derivative having a functional group (e.g., see Patent Document 4).

The 1,1-diphenylethylene derivative does not have a homopolymerization property and yields an addition reaction product in a quantitative ratio of 1:1 relative to the anionic species, hence it is advantageous in that a 1,1-diphenylalkyl group can be quantitatively introduced at the growth initiation end or the growth termination end of a polymer chain (e.g., see Non-patent Document 1).

All of these methods relate to an invention using a 1,1-diphenylethylene derivative. A 1,1-diphenylethylene derivative, however, does not seem to confer sufficient light resistance to a polymer because of its diphenyl structure. In addition, no method has been developed yet for using 1,1-diphenylethylene industrially.

Further, Patent Document 5 describes a copolymer that can have cinnamyl alcohol, which is used in the present invention, as a copolymer component. However, because the production method in Patent Document 5 employs cationic polymerization, it is difficult to quantitatively introduce cinnamyl alcohol at the growth initiation end or the growth termination end of a polymer chain unlike in a living anionic polymerization. This is because cinnamyl alcohol has a homopolymerization property.

Patent Document 1: Japanese Patent No. 2717587
Patent Document 2: Japanese Examined Publication No. 7-5649
Patent Document 3: Japanese Laid-open Patent Application No. 2006-69922
Patent Document 4: Japanese Laid-open Patent Application No. 4-11605
Patent Document 5: Japanese Laid-open Patent Application No. 2008-280378
Non-patent Document 1: Hayashi et al., Society Journal of "The Society of Rubber Industry, Japan", 80 (1), 2007, p. 20-24

SUMMARY OF THE INVENTION

Object to be Solved by the Invention

The object of the present invention is to provide a method for producing a polymer by a living anionic polymerization with the use of a material which is relatively easily used for industrial applications, wherein the number and the introduction positions of functional groups are accurately specified in the polymer.

Means to Solve the Object

The present inventors have keenly studied to solve the object mentioned above and found that the object can be solved by using compounds having a specific structure. The present invention is thus completed.

Specifically, the present invention relates to: (1) a method for producing a polymer comprising reacting an organic alkali metal compound with a cinnamyl alcohol represented by the following formula [I] or a derivative thereof, and conducting a living anionic polymerization using a reaction product of the reaction as a polymerization initiator

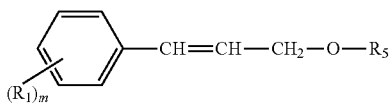

[wherein $R_1$ represents an alkyl group or alkoxy group; m represents an integer of 0 to 5 and when m is 2 or more, $R_1$s may be the same or different; $R_5$ represents a hydrogen atom, alkali metal atom, trialkylsilyl group or a substituent represented by the following formula [II]

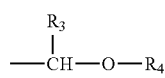

(wherein $R_3$ represents a hydrogen atom or a C1-C6 alkyl group; and $R_4$ represents an alkyl group which may be substituted by an alkoxy group, a cycloalkyl group which may be substituted by an alkoxy group, a phenyl group which may be substituted by an alkyl group, or a phenyl group which may be substituted by an alkoxy group)];

[2] a method for producing a polymer comprising:

(i) a step of subjecting an anionic polymerizable monomer to a living anionic polymerization in the presence of an anionic polymerization initiator; and (ii) a step of adding a cinnamyl alcohol represented by the following formula [I] or a derivative thereof to a reaction system for attaching the cinnamyl alcohol or a derivative thereof at a growth end

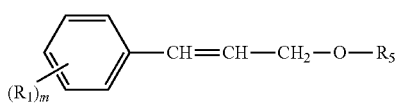

[wherein $R_1$ represents an alkyl group or alkoxy group; m represents an integer of 0 to 5 and when m is 2 or more, $R_1$s may be the same or different; $R_5$ represents a hydrogen atom, alkali metal atom, trialkylsilyl group or a substituent represented by the following formula [II]

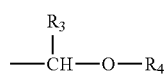

(wherein $R_3$ represents a hydrogen atom or a C1-C6 alkyl group; and $R_4$ represents an alkyl group which may be substituted by an alkoxy group, a cycloalkyl group which may be substituted by an alkoxy group, a phenyl group which may be substituted by an alkyl group, or a phenyl group which may be substituted by an alkoxy group)];

[3] the method for producing a polymer according to [2], wherein the step (ii) is followed by;

(iii) a step of further subjecting an anionic polymerizable monomer to a living anionic polymerization by using a reaction product obtained in the step (ii) as a polymerization initiator; and

[4] the method for producing a polymer according to [3], wherein the step (ii) is followed by;

(iii') a step of adding an inactivating agent to terminate the anionic polymerization.

The present invention also relates to:

[5] a star polymer obtained by reacting a core agent with a polymer, wherein the polymer is obtained by subjecting a compound represented by the following formula [I] to a reaction when initiating a living anionic polymerization

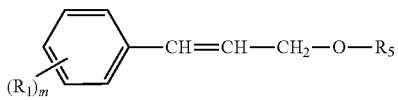

[wherein $R_1$ represents an alkyl group or alkoxy group; m represents an integer of 0 to 5 and when m is 2 or more, $R_1$s may be the same or different; $R_5$ represents a hydrogen atom, alkali metal atom, trialkylsilyl group or a substituent represented by the following formula [II]

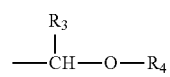

(wherein $R_3$ represents a hydrogen atom or a C1-C6 alkyl group; and $R_4$ represents an alkyl group which may be substituted by an alkoxy group, a cycloalkyl group which may be substituted by an alkoxy group, a phenyl group which may be substituted by an alkyl group, or a phenyl group which may be substituted by an alkoxy group)]; and

[6] a star polymer obtained by treating the star polymer according to [5] with an acid to generate a hydroxy group.

MODE OF CARRYING OUT THE INVENTION (Polymer)

A polymer obtained by the production method of the present invention comprises a cinnamyl alcohol derivative residue represented by the following formula [III] at an end and/or in the inside of the polymer.

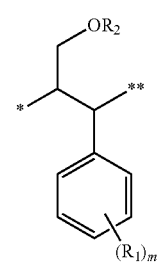

In formula [III], $R_1$ is not particularly limited as long as it is a group that does not inhibit anionic polymerization of a cinnamyl alcohol derivative, the raw material, and represents an alkyl group or an alkoxy group.

An alkyl group for $R_1$ is more preferably a C1-C6 alkyl group and the examples include a methyl group, ethyl group, propyl group, isopropyl group, n-butyl group, i-butyl group, t-butyl group, amyl group, isoamyl group and hexyl group.

An alkoxy group for $R_1$ is more preferably a C1-C6 alkoxy group and the examples include a methyloxy group, ethyloxy group, propyloxy group, i-propyloxy group, butyloxy group, sec-butyloxy group, tert-butyloxy group, amyloxy group, isoamyloxy group, tert-amyloxy group and hexyloxy group.

m represents an integer of 0 to 5 and when m is 2 or more, $R_{1s}$ may be the same or different.

$R_2$ represents an alkali metal atom, trialkylsilyl group or a substituent represented by the following formula [II].

[II]

(wherein $R_3$ represents a hydrogen atom or a C1-C6 alkyl group; and $R_4$ represents an alkyl group which may be substituted by an alkoxy group, a cycloalkyl group which may be substituted by an alkoxy group, a phenyl group which may be substituted by an alkyl group, or a phenyl group which may be substituted by an alkoxy group)

Examples of the alkali metal atom for $R_2$ include a sodium atom, lithium atom, potassium atom, rubidium atom and cesium atom.

The trialkylsilyl group for $R_2$ is more preferred to be a trialkylsilyl group wherein the alkyl group has 1 to 6 carbons, and the examples include a trimethylsilyl group, triethylsilyl group and dimethyl-tert-butylsilyl group.

In formula [II], $R_3$ represents a hydrogen atom or a C1-C6 alkyl group, and examples of the C1-C6 alkyl group include the same as those exemplified for the alkyl group for $R_1$.

$R_4$ is an alkyl group which may be substituted by an alkoxy group, a cycloalkyl group which may be substituted by an alkoxy group, a phenyl group which may be substituted by an alkyl group, or a phenyl group which may be substituted by an alkoxy group. The alkyl group and the cycloalkyl group for "an alkyl group which may be substituted by an alkoxy group, a cycloalkyl group which may be substituted by an alkoxy group" are preferably a C1-C6 alkyl group and a C1-C6 cycloalkyl group. Examples of the C1-C6 alkyl group include the same groups as those exemplified for the alkyl group for $R_1$. As for the C1-C6 cycloalkyl group, a cyclopropyl group, cyclobutyl group, cyclopentyl group and cyclohexyl group are exemplified. These groups may be substituted by an alkoxy group, where the alkoxy group is preferably a C1-C6 alkoxy group. Examples of the C1-C6 alkoxy group include the same groups as those exemplified for the alkoxy group for $R_1$.

The alkyl group and the alkoxy group for "a phenyl group which may be substituted by an alkyl group, or a phenyl group which may be substituted by an alkoxy group" are preferably a C1-C6 alkyl group and a C1-C6 alkoxy group, respectively. The specific examples include the same groups as those exemplified for the alkyl group and the alkoxy group for $R_1$.

The cinnamyl alcohol derivative residue in formula [III] is present at an end and/or in the inside of a polymer chain, and "*" and "**" in formula [III] represent binding positions.

When the above-mentioned cinnamyl alcohol derivative residue is present at the polymerization initiation end of a polymer, it binds to a residue of the polymerization initiator at the "*" position. Although the polymerization initiator is not particularly limited as long as it is, for example, a nucleophile and acts to initiate polymerization of an anionic polymerizable monomer, a living anionic polymerization initiator is preferred and such as an alkali metal and an organic alkali metal compound may be used.

Examples of the alkali metal include lithium, sodium, potassium and cesium.

Examples of the organic alkali metal compound include an alkylation product, allylation product, arylation product, etc. of the above alkali metal, and alkyllithium is particularly preferred. Specifically, ethyllithium, n-butyllithium, sec-butyllithium, t-butyllithium, ethyl sodium, lithium biphenyl, lithium naphthalene, lithium triphenyl, sodium naphthalene, potassium naphthalene, α-methylstyrene sodium dianion, 1,1-diphenylhexyllithium, 1,1-diphenyl-3-methylpentyllithium, 1,4-dilithio-2-butene, 1,6-dilithiohexane, polystyryllithium, cumyl potassium and cumyl cesium may be used. These anionic polymerization initiators may be used alone or in combination of two or more kinds thereof.

When the above-mentioned cinnamyl alcohol derivative residue is present at the polymerization termination end of the polymer, "**" represents the polymerization termination position and binds to a hydrogen atom. When the above-mentioned residue is present in the inside of the polymer, "*" and "**" both bind to monomer residues of the polymer.

A polymer obtained by the production method of the present invention comprises one or more cinnamyl alcohol derivative residues shown by formula [III] per polymer molecule. The number of the cinnamyl alcohol derivative residues shown by formula [III] in a single polymer molecule can be selected according to the purpose. While the number is not particularly limited as long as the number is in a range of from 1 to {(total of polymer repeating units)/2}, a range of 1 to 100 is preferred.

The number average molecular weight of a polymer of the present invention can be selected according to the purpose and it is not particularly limited. However, the number average molecular weight is preferably 1,000 to 1,000,000 and more preferably 1,500 to 300,000.

A polymer obtained by the production method of the present invention is a polymer comprising a cinnamyl alcohol derivative residue represented by the following formula [III] at an end and/or in the inside of the polymer chain. The polymer is not particularly limited as long as it is a polymer of monomers having anionic polymerizable unsaturated bond. A monomer which yields a polymer of the present invention is preferably exemplified by a styrene derivative, butadiene derivative, (meth)acrylate ester derivative and the like.

Specific examples of the styrene derivative include styrene, α-alkylstyrene, styrene substituted at the nucleus. A substituent at the nucleus is not particularly limited as long as it is anionic species capable of initiating polymerization and a group inactive to anionic species incapable of initiating polymerization, and the specific examples include an alkyl group, alkoxyalkyl group, alkoxy group, alkoxyalkoxy group, t-butoxycarbonyl group, t-butoxycarbonylmethyl group and tetrahydropyranyl group. Further, specific examples of the styrene derivative include α-methylstyrene, α-methyl-p-methylstyrene, p-methylstyrene, m-methylstyrene, o-methylstyrene, p-ethylstyrene, 2,4-dimethylstyrene, 2,5-dimethylstyrene, p-isopropylstyrene, 2,4,6-triisopropylstyrene, p-t-butoxystyrene, p-t-butoxy-α-methylstyrene and m-t-butoxystyrene.

Specific examples of the butadiene derivative include 1,3-butadiene, isoprene, 2,3-dimethylbutadiene, 2-ethyl-1,3-butadiene and 1,3-pentadiene.

Further, the (meth)acrylate ester derivative is preferably those in which carbon numbers of the ester alcohol residue is 1 to 20 from the viewpoint of reactivity, and the specific examples include methyl ester, ethyl ester, isopropyl ester and n-butyl ester.

Either a single type of monomer or two or more types of monomers may be used. When using two or more types of monomers, the polymer may be a random polymer or a block polymer. Examples of the monomer combination include styrene and methylmethacrylate, methylmethacrylate and ethyleneglycol dimethacrylate, n-butylmethacrylate and ethyleneglycol dimethacrylate.

(Production Method)

A method for producing a polymer of the present invention is characterized in that a compound represented by formula [I] is reacted when a living anionic polymerization is carried out.

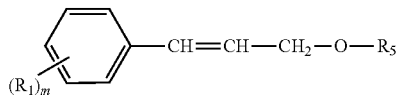

[I]

[wherein $R_1$ represents an alkyl group or alkoxy group; m represents an integer of 0 to 5 and when m is 2 or more, $R_1$s may be the same or different; $R_5$ represents a hydrogen atom, alkali metal atom, trialkylsilyl group or a substituent represented by the following formula [II]

[II]

(wherein $R_3$ represents a hydrogen atom or a C1-C6 alkyl group; and $R_4$ represents an alkyl group which may be substituted by an alkoxy group, a cycloalkyl group which may be substituted by an alkoxy group, a phenyl group which may be substituted by an alkyl group, or a phenyl group which may be substituted by an alkoxy group)]

$R_1$ in formula [I], and $R_3$ and $R_4$ in formula [II] are the same as those detailed with regard to the above-mentioned formula [III]. As for $R_5$ in formula [I], an alkali metal atom, trialkylsilyl group or a substituent represented by the following formula [II]

[II]

(wherein $R_3$ represents a hydrogen atom or a C1-C6 alkyl group; and $R_4$ represents an alkyl group which may be substituted by an alkoxy group, a cycloalkyl group which may be substituted by an alkoxy group, a phenyl group which may be substituted by an alkyl group, or a phenyl group which may be substituted by an alkoxy group) are the same as those detailed with regard to $R_2$ in formula [III]. The $R_5$ groups other than a hydrogen atom are all protective groups for the hydroxy group, and they can deprotect and give a hydroxy group after the polymer has been produced.

The production methods employing the above-mentioned method include the following cases.

(A) A Method for Producing a Polymer in which a Cinnamyl Alcohol Derivative Residue is Present at the Polymerization Initiation End of the Polymer Chain When a cinnamyl alcohol derivative residue represented by formula [III] is present at the polymerization initiation end of the polymer chain, a polymer can be produced by reacting an organic alkali metal compound with a cinnamyl alcohol represented by formula [I] or a derivative thereof and conducting a living anionic polymerization using the reaction product as a polymerization initiator.

An organic alkali metal compound is subjected to an addition reaction with a cinnamyl alcohol represented by formula [I] or a derivative thereof. The cinnamyl alcohol represented by formula [I] or a derivative thereof and the organic alkali metal compound are specifically the same as those described above.

When using a cinnamyl alcohol represented by formula [I] wherein $R_5$ is a hydrogen atom or a derivative thereof, the first step is to allow an alkali metal compound to react with an alcoholic hydroxy group of the cinnamyl alcohol derivative to give a metal alkoxide, then followed by the above-mentioned addition reaction.

A typical reaction scheme is shown below.

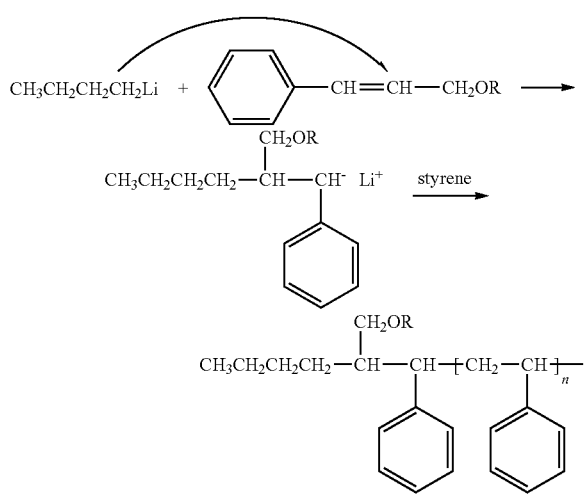

(In the scheme, R represents a group other than the hydrogen atom among those shown for $R_5$ in formula [I].)

In the present invention, reaction conditions for generating an adduct by reacting a cinnamyl alcohol represented by formula [I] or a derivative thereof with the above-mentioned organic alkali metal compound are not particularly limited, but a cinnamyl alcohol represented by formula [I] or a derivative thereof is usually used at an equimolar or higher ratio relative to the organic alkali metal compound. It is preferred to use a cinnamyl alcohol represented by formula [I] or a derivative thereof in an excess amount relative to the organic alkali metal compound in order to quantitatively progress the addition reaction of the organic alkali metal compound with the cinnamyl alcohol represented by formula [I] or a derivative thereof.

There is no upper limit to the amount of a cinnamyl alcohol represented by formula [I] or a derivative thereof to be used. However, it is preferable to use a cinnamyl alcohol represented by formula [I] or a derivative thereof in an amount of 0.1 to 10 times mol, more preferably in an amount of 0.5 to 5 times mol relative to the organic alkali metal compound, because a cinnamyl alcohol represented by formula [I] or a derivative thereof has no homopolymerization property and its excess amount shall remain in the polymerization system. However, when a cinnamyl alcohol derivative is used in an amount of 1 time mol or less relative to the organic alkali metal, an organic metal such as dibutyl magnesium and diethyl zinc is used together to inactivate the excess organic alkali metal before use.

Reaction of a cinnamyl alcohol represented by formula [I] or a derivative thereof and an organic alkali metal compound is preferably conducted in an organic solvent. Types of the organic solvent are not particularly limited and the examples of an ether group-containing solvent include an ether series compound such as diethylether, tetrahydrofuran (THF), dioxane and trioxane. These solvents may be used alone or as a mixture solvent of two or more kinds thereof.

A polar solvent may be used in combination with an ether group-containing solvent without any particular limitation as long as the polar solvent is not involved in polymerization reaction and is compatible with the polymer. Specific examples include a tertiary amine such as tetramethylethylenediamine and hexamethylphosphoric triamide.

Further, even an aliphatic compound with low polarity, an aromatic compound such as benzene, toluene and xylene, or an alicyclic hydrocarbon compound such as pentane, hexane, heptane and cyclohexane may be used by combining with an ether group-containing solvent, if such compounds are relatively compatible with a polymer. Specific examples of the combination include a combination of hexane and THF, and a combination of toluene and THF.

Temperature for addition reaction is selected from a range of usually −100° C. to 50° C., preferably −80° C. to 40° C. Because the reaction time is influenced by reaction temperature and the like, it cannot be necessarily specified. However, reaction time is usually about 1 min to 24 hours, preferably 10 min to 5 hours.

Examples of the living anionic polymerizable monomer are the same as those exemplified in the explanation for the above formula [III].

Polymerization conditions adopted for common anionic polymerization can be used as polymerization conditions for a living anionic polymerization. It is preferred, however, that a living anionic polymerization is performed under the conditions where oxygen, carbon dioxide, water, etc. will not be incorporated into the polymerization system in order not to inactivate the polymerization initiator and the active-end anion at the polymer chain end. For example, a living anionic polymerization is conducted by adding the above-mentioned monomer under either high vacuum or nitrogen atmosphere with almost no water, in a degassed and dehydrated solvent, and in the presence of a polymerization initiator. Polymerization may be conducted not by adding the total amount of the monomers at once but by gradually adding them.

By conducting polymerization using two or more types of the above-mentioned anionic polymerizable monomers in combination, a copolymer can be obtained which consists of monomers of arbitrary composition and which has a carbanion at its end. Further, following the termination of polymerization of one type of monomer, other types of monomers may be sequentially subjected to polymerization to obtain a block copolymer (diblock copolymer, triblock copolymer or multiblock copolymer) which consists of monomers of arbitrary composition and structure and which has a carbanion at its end.

In the living anionic polymerization, the ratio of a monomer and a polymerization initiator, wherein the initiator is a product from the reaction of a cinnamyl alcohol represented by formula [I] or a derivative thereof with an organic alkali metal compound, is usually 0.00005 to 0.3 mol, preferably 0.0001 to 0.2 mol of the active end anion equivalent of said reaction product relative to 1 mol of the monomer. The monomer concentration relative to a polymer solvent is not particularly limited and is usually in a range of 1-40% by weight, where a range of 2-15% by weight is preferred.

Polymerization temperature is not particularly limited as long as it is in a temperature range where side reactions such as transfer reaction and termination reaction do not occur and where monomers are consumed to complete the polymerization. It is, however, preferred to conduct polymerization at a temperature of from −70° C. to the boiling temperature of the polymerization solvent.

Polymerization time varies depending on a polymerization initiator, monomer, solvent, reaction temperature, etc. to be used, and it is usually in a range of 10 min to 10 hours. Polymerization reaction can be conducted by either batch method or sequential method.

An anion is present at the growth end of a polymer obtained by a living anionic polymerization. When this end is used as a termination point of the polymer, said anion is contacted with a killing agent such as a proton donor or alkylsilyl halide. The proton donor as a killing agent is exemplified by alcohols such as methanol, ethanol and phenol, and the alkylsilyl halide is exemplified by such as trimethylsilyl chloride. As a contact means, a killing agent may be added to the reaction system, or the polymer may be collected from the reaction system, concentrated as needed and added to the killing agent solution to precipitate the polymer.

Further, following the living anionic polymerization, acid treatment may be carried out as needed so that —OR$_5$ in formula [I] is deprotected to generate a hydroxy group. Acid treatment can be carried out by known methods and conditions, and examples of the acid for use include a strong acid such as a concentrated hydrochloric acid, hydrochloric gas, sulfuric acid, and a sulfonate compound such as methanesulfonic acid. These acids can also be used as a killing agent for an anion at the termination site of polymerization.

(B) A Method for Producing a Polymer Comprising a Cinnamyl Alcohol Derivative Residue at the Growth End or in the Inside of the Polymer Chain A polymer comprising a cinnamyl alcohol derivative residue represented by formula [III] at the growth end or in the inside of the polymer chain can be obtained by subjecting a compound of formula [I] to a reaction in the mid-course of polymerization. Specifically, the polymer can be produced by a method comprising (i) a step of subjecting an anionic polymerizable monomer to a living anionic polymerization in the presence of an anionic polymerization initiator; and (ii) a step of adding a cinnamyl alcohol represented by formula [I] or a derivative thereof to a reaction system for attaching the same at a growth end.

Examples of the anionic polymerization initiator and the monomer in step (i) are the same as those exemplified for the above-mentioned production method, and likewise for the reaction conditions. The monomer is polymerized in step (i) and its growth end comprises an active carbanion. A cinnamyl alcohol represented by formula [I] or a derivative thereof may be added to the reaction system and attached to the growth end (step (ii)).

When using a cinnamyl alcohol of formula [I] in which R$_5$ is a hydrogen atom or a derivative thereof, firstly an alkali metal compound and the alcoholic hydroxy group of a cinnamyl alcohol or a derivative thereof are allowed to react to yield a metal alkoxide, followed by the addition reaction described above.

A typical scheme is shown below.

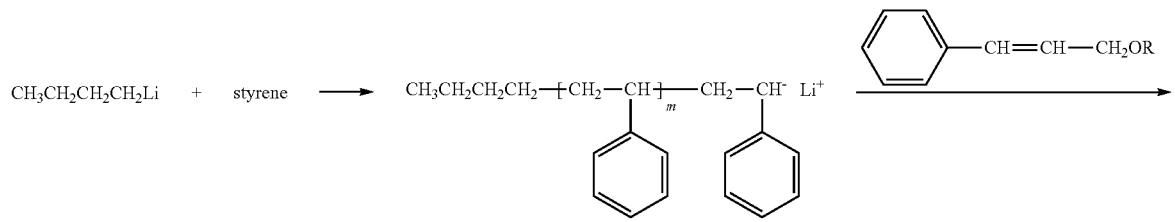

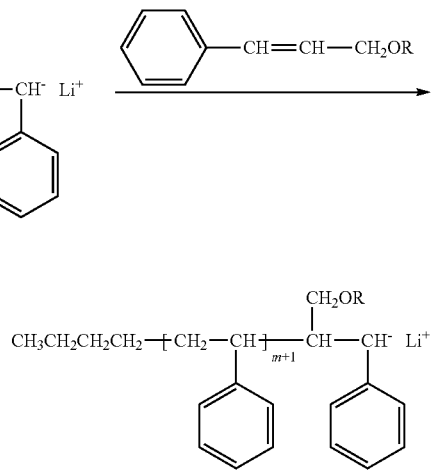

(in the scheme, R represents a group for $R_5$ in formula [I] other than a hydrogen atom)

Following the step (ii), an anionic polymerizable monomer may further be subjected to a living anionic polymerization to extend the polymer chain or may be used as a termination end by adding an inactivating agent. When further extending the polymer chain, the same type of monomer as that used prior to step (ii) may be used or a monomer of different type may be used.

A typical scheme for further extending the polymer chain following step (ii) is as follows.

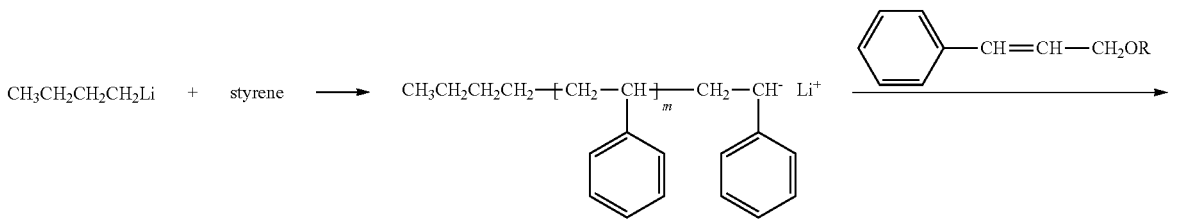

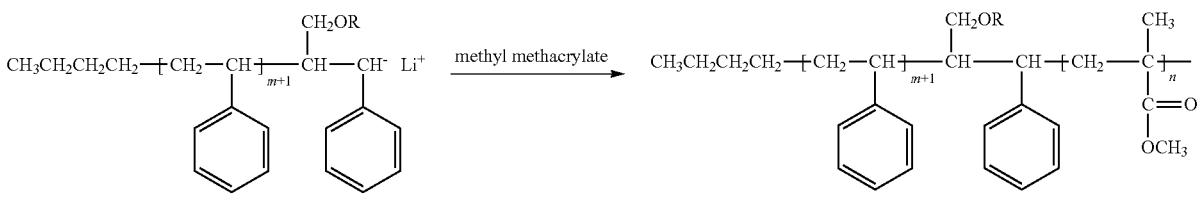

(in the scheme, R represents a group for $R_5$ in formula [I] other than a hydrogen atom)

A typical scheme for using an end of the polymer obtained in step (ii) as a termination end of the polymer chain is as follows.

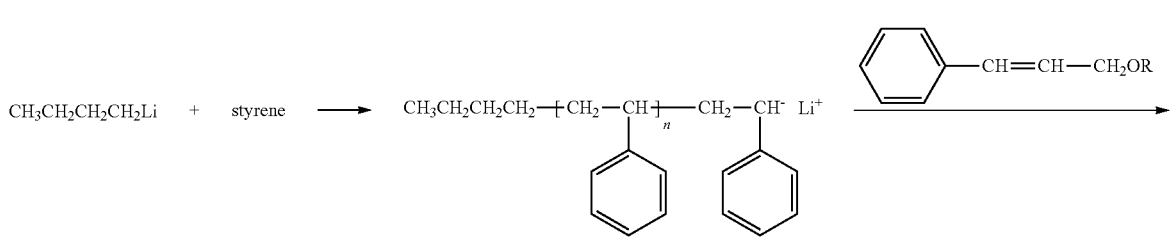

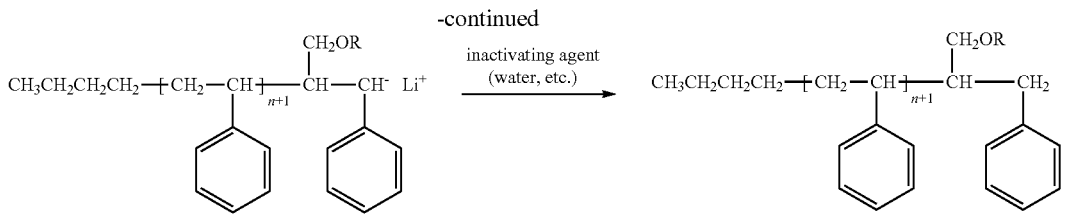

(in the scheme, R represents a group for $R_5$ in formula [I] other than a hydrogen atom)

(C) A Method for Producing a Polymer Comprising a Cinnamyl Alcohol Derivative Residue at the Initiation End, and in the Inside and/or at the Termination End of the Polymer Chain Further, a polymer having a structure represented by formula [III] at the initiation and termination ends of the polymer can also be produced by combining a production method wherein the structure of formula [III] is present at the polymerization initiation end of the polymer chain with the steps of a production method wherein the structure of formula [III] is present at the growth end or in the inside of the polymer chain. A polymer having a structure of formula [III] at the initiation end, in the inside and at the termination end of the polymer can also be produced.

A typical scheme for producing a polymer having a structure represented by formula [III] at the initiation and termination ends of the polymer is as follows.

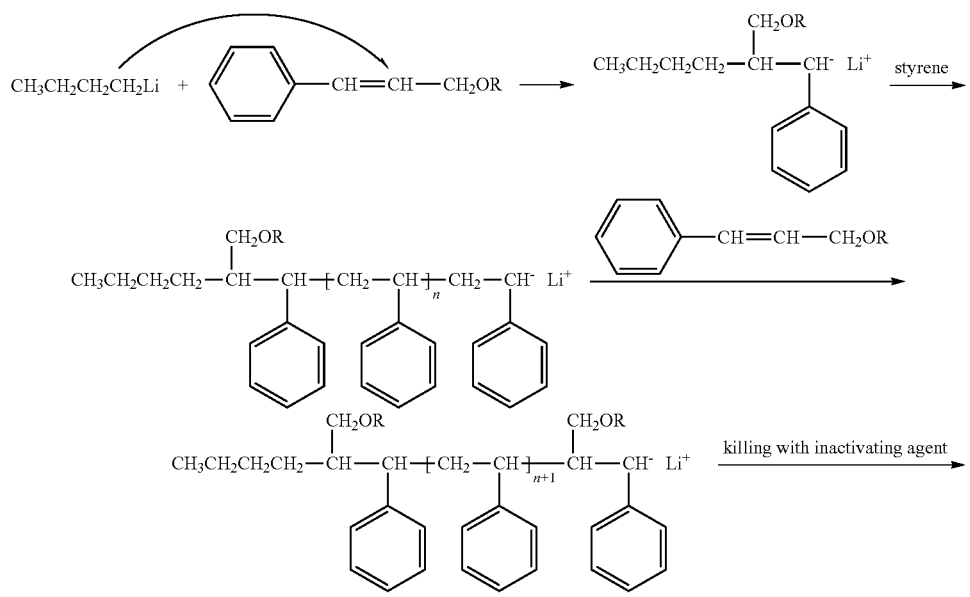

(in the scheme, R represents a group for $R_5$ in formula [I] other than a hydrogen atom)

A typical scheme for producing a polymer having a structure of formula [III] at the initiation end, in the inside, and at the termination end of the polymer is as follows.

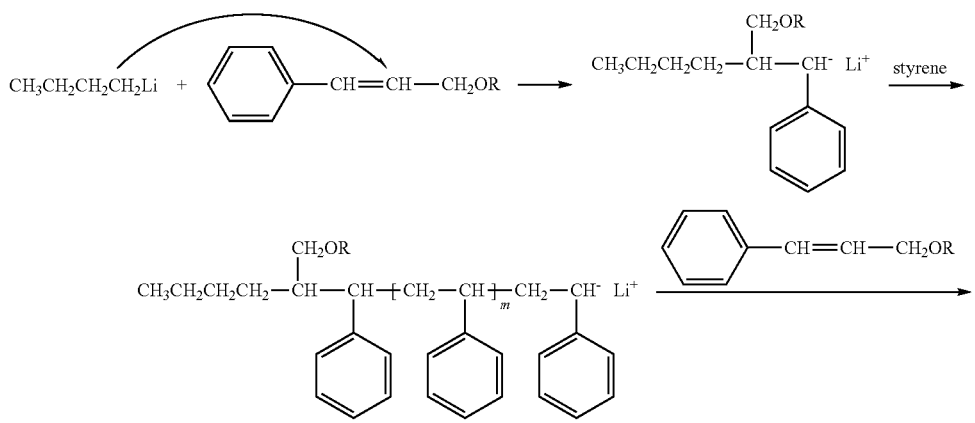

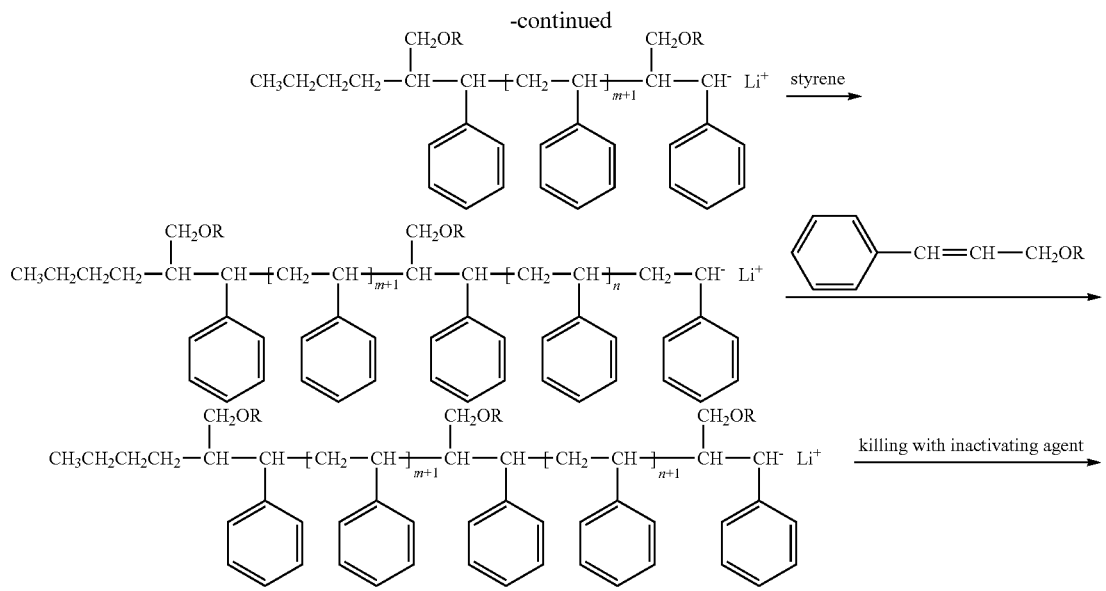

(in the scheme, R represents a group for $R_5$ in formula [I] other than a hydrogen atom)

Further, a polymer having plural structures of formula [III] within the polymer can also be produced by repeating the above step (ii).

An organic metal can be used concurrently in the production method of the present invention and examples of the organic metal include an organic magnesium, organic zinc and organic aluminum, where specifically exemplified is a metal compound which comprises an alkyl group having 1-20 carbons or aryl group having 6-20 carbons as a substituent.

Specific examples of the substituent include a methyl group, ethyl group, n-propyl group, isopropyl group, n-butyl group, s-butyl group, t-butyl group, isobutyl group, amyl group, hexyl group, benzyl group, phenyl group and naphthyl group.

Specific examples of the organic metal having magnesium, aluminum or zinc as a metallic species include di-n-butylmagnesium, di-t-butylmagnesium, di-s-butylmagnesium, n-butyl-s-butylmagnesium, n-butyl-ethylmagnesium, di-n-amylmagnesium, dibenzylmagnesium, diphenylmagnesium, diethyl zinc, di-n-butylzinc, trimethylaluminum, triethylaluminum, triisobutylaluminum and tri-n-hexylaluminum.

The organic metals exemplified above may be used alone or in combination of two or more kinds thereof.

Roles of the organic metal for use in the present invention include: inactivating the anionic polymerization initiator that exists in an excess amount, while maintaining activity of the anion which is generated through the reaction of a compound containing a functional group represented by formula [I] or [II] and an anionic polymerization initiator; stabilizing the anion at the polymerization end; controlling polymerization; and removing polymerization inhibiting substances comprising active hydrogen such as water that may enter into the system from the external environment.

An organic metal may be used in any amount within a range not affecting polymerization. Specifically, an organic metal is used in molar ratio of preferably 10:1 to 1:20, more preferably 2:1 to 1:10, especially preferably 1:1 to 1:5 relative to the anionic polymerization initiator. When the molar ratio is smaller than 10:1, polymers with controlled molecular weights or molecular weight distribution may not be stably produced with good reproducibility in the polymer production, and when the molar ratio is larger than 20:1, the growth rate may be significantly reduced in polymerization reaction.

In the production method of the present invention, an additive can be added as needed at the initiation of polymerization or during polymerization, wherein the additive comprises an alkali metal salt, an alkaline-earth metal salt, an alkali metal salt of carboxylic acids, amines, alcohols or thiols, etc. Specific examples of the additive include a mineral acid, salt or halide such as sulfate salt, nitrate salt or borate salt of sodium, potassium, barium or magnesium; an alkali metal salt of aliphatic alcohol; and an alkali metal salt of aliphatic or aromatic thiol. More specific examples include a chloride, bromide or iodide of lithium or barium; an alkoxide such as lithium borate, magnesium nitrate, sodium chloride, potassium chloride, lithium methoxide and lithium t-butoxide; phenoxide such as lithium phenoxide; carboxide such as lithium propionate; amide such as lithium diphenylamide; lithium salt, sodium salt and potassium salt of a C1-C18 alkylthiol or C1-C18 cycloalkylthiol such as ethanethiol, propanethiol and cyclohexylthiol; lithium salt, sodium salt and potassium salt of thiol containing a hydroxy group such as mercaptoethanol and p-mercaptophenol; lithium salt, sodium salt and potassium salt of thiol containing a carboxylic acid ester such as mercaptoacetic acid methyl and mercaptopropionic acid ethyl; lithium salt, sodium salt and potassium salt of aromatic thiol such as benzenethiol, toluenethiol and naphthalenethiol; lithium salt, sodium salt and potassium salt of nitrogen-containing aromatic thiol such as mercaptothiazoline, mercaptobenzothiazoline and mercaptopyrimidine. Among these, a halide of lithium, and alkali metal salt of alcohols or thiols are preferred.

These exemplified additives may be used alone or in combination of two or more kinds thereof.

Generation of a polymer of the present invention can be confirmed by employing known conditions and methods. For example, the number average molecular weight can be confirmed by Gel permeation chromatography (GPC) using polystyrene standards, etc., and remaining monomers after the reaction can be confirmed by Gas chromatography (GC), etc.

(Application of Polymers)

A polymer obtained by the production method of the present invention comprises a hydroxy group at an end and/or in the inside. Therefore, polymerization can be further conducted with a polymer of the present invention as a raw material by utilizing reactivity of the hydroxy group, and, for example, a polyurethane resin can be obtained through a reaction with an isocyanate group-containing compound and a polyester resin can be obtained through a reaction with such as carboxylic acid, carboxylic acid halide and acid anhydride.

Further, a star polymer can be obtained by allowing a polymer of the present invention to react with a polyfunctional acid halide, polyfunctional isocyanate, etc.

As a method for obtaining a star polymer from a polymer of the present invention, there is, for example, a method in which reacting a compound represented by formula [I] with the initiation end of a living anionic polymerization to obtain a polymer and then allowing the polymer to react with a core agent.

A core agent used for producing a star polymer is polyfunctional(meth)acrylate esters such as propyleneglycoldi(meth)acrylate, ethyleneglycoldi(meth)acrylate, diethyleneglycoldi(meth)acrylate, 1,4-butanedioldi(meth)acrylate, 1,6-hexanedioldi(meth)acrylate, neopentylglycoldi(meth)acrylate, ethyleneoxide denatured bisphenol A di(meth)acrylate, tricyclodecanedimethanoldi(meth)acrylate, trimethylolpropanetri(meth)acrylate and pentaerythritoltetra(meth)acrylate; an aromatic carboxylate ester compound having at least two aromatic rings in the molecule such as 4,4'-dimethoxycarbonylphenyl ether and 1,1,2,2-tetrakis(4-ethoxycarbonylphenyl)ethane; and an aromatic ketone compound having at least three aromatic rings in the molecule. The aromatic ketone compound herein represents a compound having three or more alkylphenone structures such as acetophenone in the molecule.

In the present invention, a coupling reaction occurs when allowing aromatic carboxylic acid esters such as ethyl benzoate or compounds having two aromatic alkylcarbonyl groups such as the acetophenone structure to react in the mid-course of polymerization of a styrene derivative. Consequently, molecular weight of the polymer doubles. Therefore, by performing this reaction when using, for example, a polymer comprising a hydroxy group at the initiation end, a polymer comprising hydroxy groups at both ends can be synthesized.

A polyurethane resin or polyester resin can be synthesized by using as a raw material a polymer comprising two hydroxy groups among the polymers of the present invention, and by allowing this raw material polymer to react with an isocyanate compound or carboxyl compound. Further, a polymer comprising a (meth)acrylate ester can be synthesized by allowing the raw material polymer to react with (meth)acrylate halide, (meth)acrylate anhydride or a (meth)acrylate ester compound having an isocyanate group. Still further, a star polymer can be obtained by using a polymer comprising a single hydroxy group as a raw material, and by allowing this raw material polymer to react with a polyfunctional acid halide or polyfunctional isocyanate.

Further, a polyfunctional star polymer containing (meth)acrylate ester at an end can be synthesized by using as a raw material a star polymer comprising a hydroxy group at an end among the polymers of the present invention, and by allowing this raw material polymer to react with (meth)acrylate halide or a (meth)acrylate ester compound comprising an isocyanate group.

Further, a star polymer containing carboxylic acid at an end can be synthesized through a reaction with an acid anhydrate, etc. Thus obtained star polymer can be used for an epoxy curing agent and the like. Still further, a curable composition can be produced by using a polyfunctional isocyanate.

These resins and star polymers using a polymer of the present invention as a raw material can be produced according to known reaction methods and conditions.

A polymer of the present invention, a resin or a star polymer comprising a polymer of the present invention, or a composition comprising these can be suitably used as a functional material or as a raw material for a paint, bonding agent, adhesive, sealing material, foam, thermoplastic elastomer, film material, various forming materials, resin modifier, coating agent, damping material, semiconductor sealant, waterproof agent, cultured marble, etc.

The present invention is described in detail below by way of examples, but the scope of the present invention shall not be limited to these examples.

EXAMPLE 1

To a 200 mL four-neck flask replaced with nitrogen thoroughly, THF (20.8 g) and toluene (82.8 g) were added. Thereto was added a n-butyllithium hexane solution (1.44 g; 3 mmol) at −40° C. under stirring with a stirrer, followed by the addition of 1-ethoxyethylcinnamyl ether (0.41 g; 2 mmol), stirring for 15 min, and the addition of dibutylmagnesium hexane solution (1.00 g; 1 mmol). Then, thereto was added dropwise for 13 min a solution which had been prepared by adding styrene (10.73 g; 103 mmol) to THF (9.3 g) and dehydrating the same with a dibutylmagnesium hexane solution (0.47 g; 1 mmol). Upon completion of the dropwise addition, the resultant was stirred for 15 min and added methanol (1.0 g) for killing. This solution was subjected to a gas chromatographic analysis, and no styrene monomer was observed.

Subsequently, concentrated hydrochloric acid (2.48 g; 24 mmol) was added to the resultant and stirred for 2 hours at 50° C., followed by the addition of triethylamine (1.72 g; 17 mmol). The resultant was purified by separation 3 times using pure water (50 g), concentrated, dropped into methanol (600 ml) to precipitate a polymer, stirred for 1 hour and filtered, then dried under reduced pressure at 40° C. This polymer exhibited the number average molecular weight of 16,900 and the molecular weight distribution of 1.26.

EXAMPLE 2

To a 200 mL four-neck flask replaced with nitrogen thoroughly, THF (83.0 g) and lithium chloride (0.34 g: 8 mmol) were added. Thereto was added a n-butyllithium hexane solution (1.14 g; 3 mmol) at room temperature under stirring with a stirrer, followed by stirring for 50 min. The resultant mixture was subsequently cooled to −50° C. and added a n-butyllithium hexane solution (1.73 g; 4 mmol), followed by the addition of 1-ethoxyethylcinnamyl ether (0.95 g; 5 mmol), stirring for 15 min, and the addition of diethylzinc hexane solution (0.76 g; 1 mmol). Then, thereto was added dropwise for 8 min a solution which had been prepared by adding methylmethacrylate (10.58 g; 106 mmol) to THF (12.3 g) and dehydrating the same with a diethylzinc hexane solution (0.65 g; 1 mmol). Upon completion of the dropwise addition, the resultant was stirred for 15 min and added methanol (1.0 g) for killing, and reverted to room temperature. This solution was subjected to a gas chromatographic analysis, and no methylmethacrylate monomer was observed.

Subsequently, concentrated hydrochloric acid (2.51 g; 25 mmol) was added to the resultant and stirred for 2 hours at 50°

C., followed by the addition of triethylamine (1.42 g; 14 mmol). The triethylamine/hydrochloride salt was subjected to filtration and concentration. The resultant was dropped into diluted water (600 g) to precipitate a polymer, stirred for 1 hour, filtered, and dried under reduced pressure at 40° C. This polymer exhibited the number average molecular weight of 9,500 and the molecular weight distribution of 1.07.

EXAMPLE 3

To a 500 mL four-neck flask replaced with nitrogen thoroughly, THF (103.3 g), toluene (64.1 g) and lithium chloride (1.81 g: 43 mmol) were added. Thereto was added a s-butyllithium hexane solution (13.16 g; 21 mmol) under stirring with a stirrer, followed by stirring for 8 min, further followed by the addition of 1-ethoxyethylcinnamyl ether (4.28 g: 21 mmol) and stirring for 5 min. Then, thereto was added dropwise for 11 min a solution which had been prepared by adding methylmethacrylate (31.03 g; 310 mmol) to THF (31.6 g) and dehydrating the same with a diethylzinc hexane solution (1.11 g; 2 mmol). Upon completion of the dropwise addition, the resultant was stirred for 30 min and added methanol (1.62 g) for killing, and reverted to room temperature. This solution was subjected to a gas chromatographic analysis, and no methylmethacrylate monomer was observed.

The polymer solution was concentrated, dropped into methanol (1.5 L) and stirred for 1 hour. The resultant solution was subjected to decantation, added pure water (1 L), stirred for 15 min and filtered, then followed by drying under reduced pressure at 40° C. This polymer exhibited the number average molecular weight of 6,400 and the molecular weight distribution of 1.08.

EXAMPLE 4

To a 300 mL five-neck flask replaced with nitrogen thoroughly, THF (31.9 g) and toluene (121.3 g) were added. Thereto was added a n-butyllithium hexane solution (1.71 g; 4 mmol) at −40° C. under stirring with a stirrer, followed by stirring for 5 min. Then, thereto was added dropwise for 10 min a solution which had been prepared by adding styrene:ST (5.21 g; 50 mmol) to THF (7.0 g) and dehydrating the same with a dibutylmagnesium hexane solution (0.42 g; 1 mmol). Upon completion of the dropwise addition, the resultant was stirred for 5 min. Subsequently, thereto was added a solution and stirred for 15 min, wherein the added solution was prepared by adding 1-ethoxyethylcinnamyl ether (0.94 g; 5 mmol) to THF (3.6 g) and dehydrating the same with a dibutylmagnesium hexane solution (0.55 g; 1 mmol). Then, thereto was added dropwise for 5 min a solution which had been prepared by adding methylmethacrylate (5.36 g; 54 mmol) and lithium chloride (0.23 g: 5 mmol) to THF (11.5 g) and dehydrating the same with a diethylzinc hexane solution (1.00 g; 1 mmol). Upon completion of the dropwise addition, the resultant was stirred for 30 min and added methanol (0.7 g) for killing, and reverted to room temperature. This solution was subjected to a gas chromatographic analysis, and neither styrene monomer nor methylmethacrylate monomer was observed.

The solution was then concentrated and dropped into methanol (600 ml) to precipitate a polymer, stirred for 1 hour and filtered, then dried under reduced pressure at 40° C. This polymer exhibited the number average molecular weight of 4,000 and the molecular weight distribution of 1.11.

EXAMPLE 5

To a 200 mL four-neck flask replaced with nitrogen thoroughly, cinnamyl alcohol (0.81 g; 6 mmol), THF (87.4 g) and lithium chloride (0.51 g: 12 mmol) were added. Thereto was added a n-butyllithium hexane solution (5.47 g; 13 mmol) at −40° C. under stirring with a stirrer, followed by stirring for 20 min and the addition of diethylzinc hexane solution (5.50 g; 8 mmol). Then, thereto was added dropwise at −50° C. for 8 min a solution which had been prepared by adding methylmethacrylate (10.11 g; 101 mmol) to THF (11.4 g) and dehydrating the same with a diethylzinc hexane solution (0.38 g; 0.5 mmol). Upon completion of the dropwise addition, the resultant was stirred for 20 mm and added methanol (1.4 g) for killing, and reverted to room temperature. This solution was subjected to a gas chromatographic analysis, and no methylmethacrylate monomer was observed.

The obtained polymer solution was concentrated by adding acetic acid (0.5 g) and dropped into pure water (600 mL) to precipitate a polymer, stirred for 1 hour and filtered, then dried under reduced pressure at 40° C. This polymer exhibited the number average molecular weight of 19,000 and the molecular weight distribution of 1.25.

EXAMPLE 6

To a 200 mL four-neck flask replaced with nitrogen thoroughly, cinnamyl alcohol (0.81 g; 6 mmol), toluene (26.3 g) and THF (57.1 g) were added. Thereto was added a n-butyllithium hexane solution (4.63 g; 11 mmol) at −40° C. under stirring with a stirrer, followed by stirring for 20 min and the addition of dibutylmagnesium hexane solution (1.38 g; 2 mmol). Then, thereto was added dropwise for 6 min a solution which had been prepared by adding styrene (10.68 g; 103 mmol) to THF (13.3 g) and dehydrating the same with a dibutylmagnesium hexane solution (0.38 g; 0.5 mmol). Upon completion of the dropwise addition, the resultant was stirred for 20 min and added methanol (1.8 g) for killing, and reverted to room temperature. This solution was subjected to a gas chromatographic analysis, and no styrene monomer was observed.

The obtained polymer solution was concentrated, added acetic acid (0.5 g), stirred, dropped into methanol (600 mL) to precipitate a polymer, stirred for 1 hour and filtered, followed by drying under reduced pressure at 40° C. This polymer exhibited the number average molecular weight of 4,600 and the molecular weight distribution of 1.32.

EXAMPLE 7

To a 500 mL four-neck flask replaced with nitrogen thoroughly, THF (206.1 g) and lithium chloride (0.87 g: 21 mmol) were added. Thereto was added a n-butyllithium hexane solution (1.79 g; 4 mmol) at room temperature under stirring with a stirrer, followed by stirring for 60 min. Subsequently, the resultant was cooled to −50° C., added a s-butyllithium hexane solution (9.54 g; 15 mmol), stirred for 9 min, followed by the addition of 1-ethoxyethylcinnamyl ether (3.26 g: 16 mmol) and stirred for 5 min. Then, thereto was added dropwise for 16 min a solution which had been prepared by adding methylmethacrylate (30.47 g; 304 mmol) to THF (31.0 g) and dehydrating the same with a diethylzinc hexane solution (1.36 g; 2 mmol). Upon completion of the dropwise addition, the resultant was stirred for 5 min. Then, thereto was added dropwise for 2 min a solution which had been prepared by adding ethyleneglycol dimethacrylate (3.02 g; 15 mmol) to THF (7.2 g) and dehydrating the same with a diethylzinc hexane solution (1.16 g; 2 mmol). Upon completion of the dropwise addition, the resultant was stirred for 60 min, added methanol (1.74 g) for killing, and reverted to room temperature. This solution was subjected to a gas chromatographic analysis, and neither methylmethacrylate monomer nor ethyleneglycol dimethacrylate monomer was observed.

Subsequently, concentrated hydrochloric acid (4.93 g; 49 mmol) was added to the resultant and stirred for 2 hours at 50° C., followed by the addition of triethylamine (2.26 g; 22 mmol). The triethylamine/hydrochloride salt was subjected to filtration. The resultant was dropped into methanol (2 L) to precipitate a polymer, stirred for 1 hour and filtered, then dried under reduced pressure at 40° C. This polymer exhibited the number average molecular weight of 64,000 and the molecular weight distribution of 1.1.3.

EXAMPLE 8

To a 1 L five-neck flask replaced with nitrogen thoroughly, THF (408.8 g) and lithium chloride (3.43 g: 81 mmol) were added. Thereto was added a n-butyllithium hexane solution (2.14 g; 5 mmol) at room temperature under stirring with a stirrer, followed by stirring for 60 min. Then, the resultant was cooled to −50° C., added a s-butyllithium hexane solution (25.83 g; 40 mmol), stirred for 9 min, followed by the addition of 1-ethoxyethylcinnamyl ether (9.14 g: 44 mmol) and stirred for 2 min. Then, thereto was added dropwise for 15 min a solution which had been prepared by adding n-butyl methacrylate (61.66 g; 434 mmol) to THF (61.0 g) and dehydrating the same with a diethylzinc hexane solution (1.21 g; 2 mmol). Upon completion of the dropwise addition, the resultant was stirred for 5 min. Then, thereto was added dropwise for 4 min a solution which had been prepared by adding ethyleneglycol dimethacrylate (7.89 g; 40 mmol) to THF (10.9 g) and dehydrating the same with a diethylzinc hexane solution (0.76 g; 1 mmol). Upon completion of the dropwise addition, the resultant was stirred for 60 min, added methanol (2.36 g) for killing, and reverted to room temperature. This solution was subjected to a gas chromatographic analysis, and neither n-butylmethacrylate monomer nor ethyleneglycol dimethacrylate monomer was observed.

Subsequently, the resultant was added concentrated hydrochloric acid (9.21 g; 91 mmol), stirred for 2 hours at 50° C., added triethylamine (4.99 g; 49 mmol) and stirred, and then added acetic acid (0.62 g; 10 mmol). The triethylamine/hydrochloride salt was subjected to filtration and concentration, and then dropped into methanol (2 L) to precipitate a polymer. After stirring for 10 min, the resultant solution was subjected to decantation, added methanol (2 L) and stirred for 1 hour, then followed by decantation. Thereto was added pure water (2 L), stirred for 30 min and filtered, then dried under reduced pressure at 40° C. This polymer exhibited the number average molecular weight of 27,000 and the molecular weight distribution of 1.24.

EXAMPLE 9

To a 300 mL four-neck flask replaced with nitrogen thoroughly, THF (151.9 g) and lithium chloride (0.76 g: 18 mmol) were added. Thereto was added a n-BuLi solution (1.52 g; 4 mmol) at room temperature under stirring with a stirrer, followed by stirring for 15 min. Then, thereto was added cinnamyl alcohol (2.71 g; 19 mmol) and the resultant was cooled to −40° C., added a n-butyllithium hexane solution (8.65 g; 21 mmol) followed by the addition of a s-BuLi hexane solution (6.88 g; 11 mmol) and stirred for 30 mm. The resultant was subsequently cooled to −50° C. and added dropwise for 13 min with a solution which had been prepared by adding methylmethacrylate (30.26 g; 302 mmol) to THF (31.4 g) and dehydrating the same with a diethylzinc hexane solution (1.18 g; 2 mmol). Upon completion of the dropwise addition, the resultant was stirred for 5 min. Then, thereto was added dropwise for 3 min a solution which had been prepared by adding ethyleneglycol dimethacrylate (4.13 g; 21 mmol) to THF (6.3 g) and dehydrating the same with a diethylzinc hexane solution (0.81 g; 1 mmol). Upon completion of the dropwise addition, the resultant was stirred for 5 min, added acetic acid (2.1 g) for killing, and reverted to room temperature. This solution was subjected to a gas chromatographic analysis, and neither methylmethacrylate monomer nor ethyleneglycol dimethacrylate monomer was observed. The obtained polymer solution was concentrated, dropped into methanol (2 L) to precipitate a polymer, stirred for 1 hour and filtered, then dried under reduced pressure at 40° C. This polymer exhibited the number average molecular weight of 64,000 and the molecular weight distribution of 1.25.

EXAMPLE 10

To a 300 mL four-neck flask replaced with nitrogen thoroughly, toluene (123.4 g) and THF (32.0 g) were added. Thereto was added a 3-(t-butyldimethylsilyloxy)-1-propyllithium cyclohexane solution (18.40 g; 20.62 mmol) at −40° C. under stirring with a stirrer, followed by stirring for 1 min. Then, thereto was added dropwise for 15 min a solution which had been prepared by adding styrene (32.23 g; 309 mmol) to THF (30.1 g) and dehydrating the same with a dibutylmagnesium hexane solution (0.95 g; 1 mmol). Upon completion of the dropwise addition, the resultant was stirred for 15 min. Then, thereto was added dropwise for 3 min a solution which had been prepared by adding 1-ethoxyethylcinnamyl ether (4.11 g: 20 mmol) to THF (6.5 g) and dehydrating the same with a dibutylmagnesium hexane solution (0.74 g; 1 mmol). Upon completion of the dropwise addition, the resultant was stirred for 30 min, added methanol (2.29 g) for killing and reverted to room temperature. This solution was subjected to a gas chromatographic analysis, and no styrene was observed.

The obtained polymer solution was added THF (61.8 g), methanol (30.3 g) and concentrated hydrochloric acid (7.65 g; 76 mmol), stirred for 2 hours at 50° C., added triethylamine (5.21 g; 52 mmol) and stirred for a certain time, followed by the addition of acetic acid (5.17 g; 86 mmol). The triethylamine/hydrochloride salt was filtered, concentrated and dried, then dissolved in ethyl acetate. The resultant was dropped into methanol (1.5 L) to precipitate a polymer, stirred for 1 hour and filtered, then dried under reduced pressure at 40° C. This polymer exhibited the number average molecular weight of 4,800 and the molecular weight distribution of 1.19.

EXAMPLE 11

To a 500 mL recovery flask, the polymer synthesized in Example 8 (54.9 g) was added and dissolved in dimethylformamide (DMF) (276.2 g). Then, thereto was added methacrylate chloride (4.26 g; 41 mmol), then gradually added triethylamine (4.48 g; 44 mmol) at room temperature under stirring, and the resultant was stirred for 4 hours and left overnight. This solution was filtered, concentrated, added acetic acid (5.28 g) and ethyl acetate (250 g), and separated twice with pure water (200 g). The ethyl acetate layer was then concentrated and dropped into methanol (2 L) under stirring. The resultant solution was subjected to decantation, added pure water (1.5 L), stirred for 1 hour, filtered, then dried under reduced pressure at 40° C. This polymer was subjected to NMR determination and it was confirmed that a methacryloyl group had been introduced.

INDUSTRIAL APPLICABILITY

A polymer wherein the number and the introduction positions of functional groups are accurately specified can be easily produced by employing the production method of the present invention.

A polymer obtained by the production method of the present invention is useful as a high molecular material, since the polymer can be functionalized by utilizing its functional groups and can be applied to a curable resin or used as various prepolymers. The polymer can be easily applied to paints, adhesives, resist materials and the like.

The invention claimed is:

1. A method for producing a polymer comprising:
   (i) a step of subjecting an anionic polymerizable monomer to a living anionic polymerization in the presence of an anionic polymerization initiator; and
   (ii) a step of adding a cinnamyl alcohol or a derivative thereof represented by the following formula [I] to a reaction system for attaching the cinnamyl alcohol or a derivative thereof at a growth end

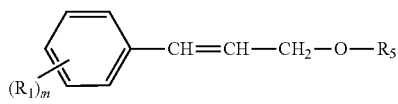

[I]

wherein $R_1$ represents an alkyl group or alkoxy group; m represents an integer of 0 to 5 and when m is 2 or more, $R_1$s may be the same or different; $R_5$ represents a hydrogen atom, alkali metal atom, trialkylsilyl group or a substituent represented by the following formula [II]

[II]

wherein $R_3$ represents a hydrogen atom or a C1-C6 alkyl group; and $R_4$ represents an alkyl group which may be substituted by an alkoxy group, a cycloalkyl group which may be substituted by an alkoxy group, a phenyl group which may be substituted by an alkyl group, or a phenyl group which may be substituted by an alkoxy group.

2. The method for producing a polymer according to claim 1, wherein the step (ii) is followed by;
   (iii) a step of further subjecting an anionic polymerizable monomer to a living anionic polymerization by using a reaction product obtained in the step (ii) as a polymerization initiator.

3. The method for producing a polymer according to claim 1, wherein the step (ii) is followed by;
   (iii') a step of adding an inactivating agent to terminate the anionic polymerization.

* * * * *